United States Patent Office 3,403,495
Patented Oct. 1, 1968

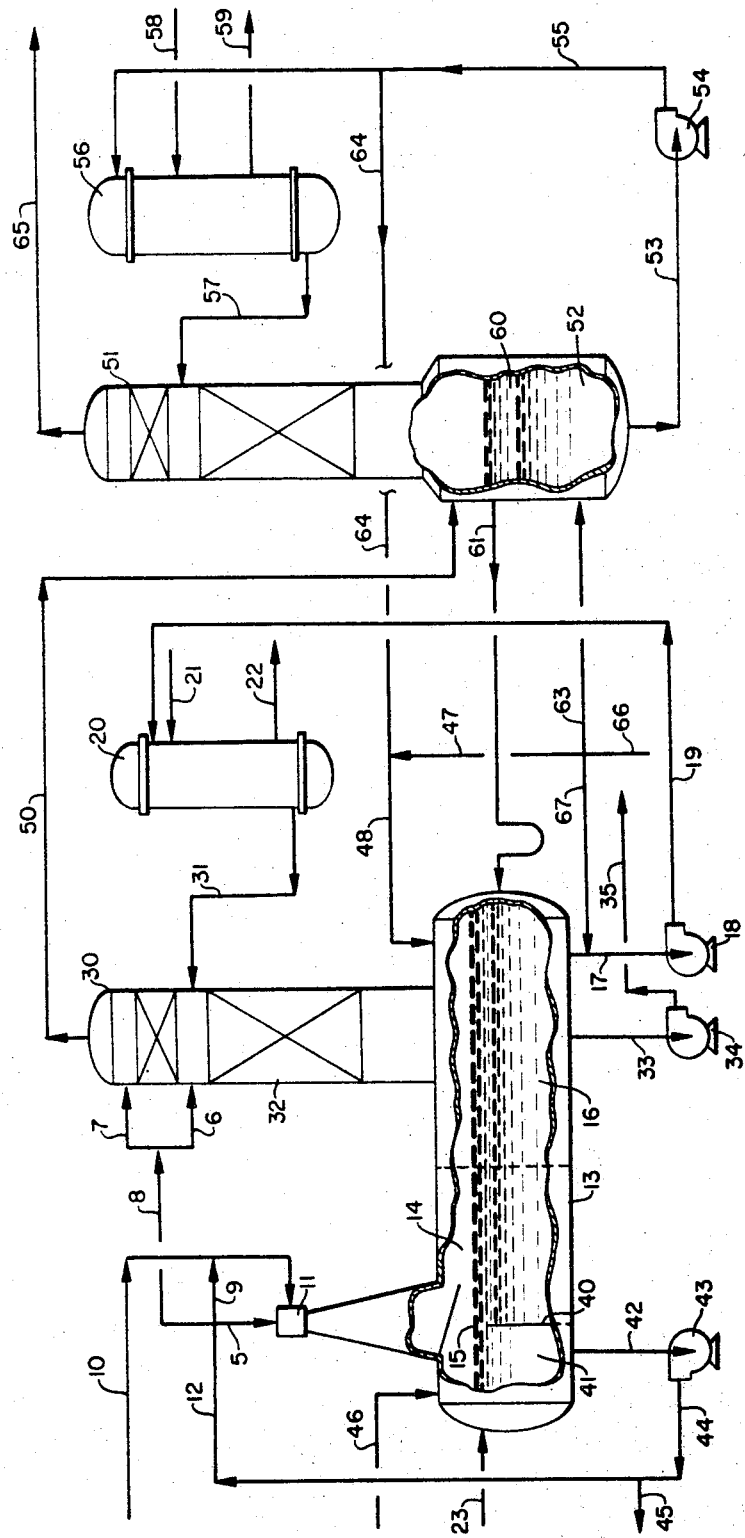

3,403,495
TETRAALKYLLEAD RECOVERY PROCESS
Wilbur C. Jaasma, Greenville, S.C., assignor to Ethyl Corporation, New York, N.Y., a corporation of Virginia
Continuation-in-part of application Ser. No. 627,014, Mar. 30, 1967. This application Oct. 24, 1967, Ser. No. 677,714
19 Claims. (Cl. 55—72)

ABSTRACT OF THE DISCLOSURE

This invention relates to the manufacture and recovery of tetraalkyllead compounds by a new and novel process which recovers tetraalkyllead compounds from an inert gas stream by contacting the stream at least once with an inert organic scrubbing liquid.

Cross references to related application

This application is a continuation-in-part of application Ser. No. 627,014, filed Mar. 30, 1967 and now abandoned.

Background of invention

The tetraalkyllead compounds, particularly tetraethyllead and tetramethyllead, are well known organometallics highly effective as antiknock additives for hydrocarbon fuels for internal combustion engines. These valuable chemicals may be synthesized by many processes, one of which is the reaction of an alloy of lead and an alkali metal, especially sodium, with an alkyl halide, the alkyl group thereof being that which is desired for attachment in the tetraalkyllead compound. As an illustration, such a reaction for the synthesis of tetramethyllead is represented by the equation

$$4NaPb + 4CH_3Cl \rightarrow (CH_3)_4Pb + 4NaCl + 3Pb$$

Yields in the order of 80–90 percent are usually achieved in commercial processes utilizing the foregoing reaction.

In processes utilizing the reaction as indicated above, it is common to carry out the process in the presence of various catalysts or catalyst systems, as well as hydrocarbon diluents, catalysts, or both, to aid in the control and handling of the reaction and reaction products. Following the reaction, both when carried out on a batch or continuous basis, it is necessary to recover the desired tetraalkyllead compound from a reaction mass which contains the tetraalkyllead product, sodium chloride, lead, any excess alkyl halide, catalyst and other items which may be present during the reaction. One of the principal ways for recovery of tetraalkyllead product is to subject the reaction mass to steam distillation, either with or without the presence of substantial additional quantities of water. To effect the steam distillation, the reaction mass is transferred from a reactor to steam distillation apparatus by mechanical means such as plows or conveyers within the reactor and this transfer is assisted by blanketing the reaction mass with a gas inert to the reaction mass or the components thereof and using the inert gas pressure to assist in the transfer of a reaction mass to the steam distillation apparatus.

During the transfer of the reaction mass with inert gas, quantities of inert gas are vented through the steam still apparatus or other venting means and this venting of inert gas causes vaporization of the tetraalkyllead product and hydrocarbon diluent, catalyst and reaction by-products which may accompany the product.

Past efforts to prevent the loss of the tetraalkyllead product and accompanying hydrocarbon during transfer in such a process and other transfers or blending operations have been ineffective primarily because of the presence of quantities of water vapor in the venting gas stream. Previous methods have been to pass the vented gas containing the tetraalkyllead product through a condenser system in an attempt to condense out tetraalkyllead product and accompanying hydrocarbon, if any; however, because of the boiling points of the tetraalkyllead products and hydrocarbons used, attending water vapor causes ice formation within the condenser and plugging thereof. Also, the presence of vaporizable aluminum compounds resulting from aluminum catalysts or co-catalyst systems used tend to condense and to plug the condenser also. This plugging makes present condenser systems ineffective and causes the loss of valuable tetraalkyllead product by failure to recover the tetraalkyllead product from inert gas streams.

Summary of the invention

In accordance with the present invention, there is provided in a process for the production of tetraalkyllead product wherein tetraalkyllead containing inert gas is obtained, the improvement in the recovery of tetraalkyllead product comprising, in combination:

(a) Providing a first sump or organic scrubbing liquid,
(b) Cooling a portion of said organic scrubbing liquid from said first sump,
(c) Contacting said tetraalkyllead containing inert gas with the cooled portion of said organic scrubbing liquid to produce a first scrubbed gaseous phase and a first contacted organic liquid phase,
(d) Returning said first contacted organic liquid phase to said first sump, and
(e) Recovering a portion of said first sump as said tetraalkyllead product.

By the process of this invention, valuable tetraalkyllead product and accompanying hydrocarbon, if any, may be recovered in a simple and easy manner from one or more inert gas or vent streams occurring in the production of tetraalkyllead product and the overall yield of product from commercial processes may be increased.

Brief description of the drawing

The drawing is a schematic flow diagram of a process of this invention showing several sections of the process partially in detail and in cross section.

Description of a preferred embodiment

The process of this invention is applicable to the production of tetraalkylleads in general; however, the invention will be described in reference to the production of tetramethyllead in the presence of toluene. Referring now to the drawing, inert gas vapor from a steam still or other product recovery or production means containing quantities of tetramethyllead and toluene or other volatile condensables such as aluminum compounds enters the process of this invention by line 10 and is fed to fume scrubber 11 where it is contacted with aqueous caustic solution entering fume scrubber 11 by line 12 and line 5 to produce a scrubbed gas phase indicated in first sump vessel 13 at 14 and an aqueous liquid phase 15. Should the quantity or quality of volatile aluminum compounds, or other material, in the inert gas stream of line 10 be such that condensation thereof may cause plugging of fume scrubber 11, additional quantities of aqueous caustic solution may be added to or blended with the entering inert gas stream by line 9 to prevent such plugging. It is clear also that when the process of this invention is used for the recovery of tetraalkyllead product from an inert gas stream containing no or substantially no volatile aluminum compound or like material, fume scrubber 11 may be bypassed or eliminated, and the product containing inert gas fed directly to vapor space 14 without any pretreatment.

A first sump in vessel 13 containing the aqueous liquid phase 15 and a first organic liquid 16 is maintained, and organic liquid phase 16 from this first sump is removed by line 17 through pump 18 and line 19 to cooler 20 where the first organic liquid phase may be cooled to a temperature of from about −10° F. to about 50° F. by brine entering cooler 20 by line 21 and leaving by line 22. Cooled first organic liquid phase from cooler 20 enters tower 30 by line 31 where it contacts scrubbed gas phase 14 from vessel 13 countercurrently. Suitable packing section 32 or other contacting means such as distillation plates may be provided in tower 30 to permit good contact of the liquid and gas phases. The first organic liquid phase after contact returns to vessel 13 and settles to the organic liquid phase 16 with extracted tetramethyllead and toluene contained therein, and tetramethyllead product and toluene recovered from the scrubbed gas phase, along with first organic liquid are removed from the system as product by line 33 to pump 34 and then to process product recovery by line 35.

By the use of weir 40 located within vessel 13, first organic liquid phase is retained within the vessel, except for that removed to product recovery, and aqueous liquid phase is permitted to overflow into aqueous sump 41 where it may be removed by line 42 through pump 43 and recycled to fume scrubber 11 by line 44 joining line 12. As necessary, portions of contaminated aqueous caustic solution may be removed from the system to waste by line 45 and fresh aqueous caustic solution added to the system by line 46.

In operation of the process over long periods, it may be necessary or desirable to provide a continuing or intermittent aqueous caustic wash for tower 30 to prevent buildup of deposits in the contacting section 32 or the demisting section, if any, above the contacting section. When this is necessary or desirable, aqueous caustic solution from line 12 may be supplied in a desired quantity by line 8 through line 6 or 7 or both.

As necessary, and generally in a volume approximating that volume removed to product recovery, substantially pure organic scrubbing liquid may be added to the system from a supply not shown by line 66 to line 47 and then to line 48.

In most process applications, the concentration of desirable products in the second scrubbed gaseous phase exiting tower 30 by line 50 is reduced to a minimum and the venting gas phase either may be recovered for reuse as inert gas or vented to the atmosphere without pollution. In operation in this manner as a single tower system, it is desirable to supply substantially pure organic scrubbing liquid in a necessary volume to that portion of the scrubbing liquid being pumped to cooler 20 and this may be accomplished as shown by line 67 from supply line 66.

Under certain conditions of production and high volumes of vent gas, it is sometimes desirable to remove only a major portion of product from the inert gas system in tower 30 and to remove the final minor portion of the product in tower 51 which may be substantially identical to tower 30. When operating the process of this invention in this manner, second scrubbed gaseous phase exiting tower 30 by line 50 is fed to the bottom portion of tower 51 where it is contacted countercurrently with organic scrubbing liquid from sump 52 in the bottom portion of tower 51. The organic liquid is removed by line 53 and pumped by pump 54 through line 55 to cooler 56 and from cooler 56 to the top portion of tower 51 by line 57. As in the case with cooler 20, chilled brine enters cooler 56 by line 58 and exits by line 59 to cool the organic liquid to a temperature of from about −10° F. to about 50° F. The second contacting organic liquid phase flows down tower 51 to sump 52 which is connected by line 61 to first sump 16 so that product containing organic liquid does not build up within sump 52 beyond the level of connecting line 61 and any excess product containing organic liquid flows to sump 16 within vessel 13 for use in the first contacting in tower 30 and subsequent removal to product recovery. Any aqueous phase which may be present in second sump 52 as indicated at 60 also may flow to the first sump in vessel 13 for joining with the aqueous phase therein as indicated at 15.

When the system is operated using two contacting towers, substantially pure organic scrubbing liquid may be charged to the system of both sumps; however, it is preferred to charge it by line 63 only in a quantity substantially equal to that being removed to product recovery. In this manner, substantially pure organic contacting liquid is used to remove the remaining trace quantities of product from gaseous phase entering tower 51 to obtain a more efficient operation. Connecting line 64 joining line 48 may be provided to pump quantities of organic liquid to first sump 16 to maintain the desired level, if needed, and the substantially product free inert gas exiting tower 51 by line 65 may be vented to the atmosphere without air pollution problems or recovery for reuse in an inert gas system, if desired.

In operation, the absorption of the tetraalkyllead product and hydrocarbon present, if any, may be obtained in only one column; however, in treating an inert gas containing tetramethyllead and toluene, it is preferred to use at least two absorption towers operating in series as described above. Inert gas vapor containing vaporous product is fed to a fume scrubber wherein contact is made with an aqueous caustic solution, and in operation of the process for the recovery of tetramethyllead and toluene, it is preferred to use an aqueous solution of sodium hydroxide having a concentration of from about 1 to about 25 percent by weight of said aqueous solution. An even more preferred caustic concentration is from about 2 to about 8 percent by weight of said aqueous solution.

One purpose of the fume scrubber is to remove any vaporizable compounds which may have been formed as by-product in the tetraalkyllead production reaction or in other reactions. In the manufacture of tetramethyllead, organo aluminum compounds, alone or in combination with other compounds, may be used as catalysts for the production reaction and during the reaction, vaporizable organo aluminum compounds may be formed and be present in the inert gas vapor. These compounds, if present, will precipitate out causing the fouling of process apparatus surfaces when an inert gas stream is treated in accordance with this invention to recover the tetramethyllead product. When these organo aluminum compounds are present, it is preferred to use an aqueous solution of sodium hydroxide; however, it is clear that if other catalyst systems or other co-catalyst systems are used, other scrubbing systems to remove such compounds are clearly within the scope of this invention.

Any organic liquid having high solvency for the produced tetraalkyllead compound may be used in the organic liquid contacting steps, and it is preferred to use an organic liquid which may be added to or blended with the desired tetraalkyllead product in subsequent processing steps. When recovery of tetramethyllead or tetramethyllead and toluene mixtures is effected by the process of this invention, it is preferred to use an alkyl halide compound such as ethylene dichloride or ethylene dibromide as organic liquid.

Insert gas containing the tetraalkyllead compound to be recovered may enter the process of this invention at substantially any pressure and any temperature. It is preferred for simplicity of operation and construction of apparatus that the process of this invention be operated at substantially atmospheric pressure, and the temperature of the product containing inert gas entering the process of the invention should be within the known limits of thermal stability of the tetraalkyllead product to be recovered. In the manufacture of tetramethyllead and its recovery in accordance with the process of this invention, it is preferred that the tetramethyllead or tetramethyllead-toluene containing inert gas vapors enter the process of this invention at a temperature of from about 80° F. to about 130° F. and preferably at a temperature of from about 90° F. to about 120° F.

In the process of this invention when only one contacting tower is used, it will be clear that sufficient volumes of organic scrubbing liquid cooled to temperatures below the boiling point of the tetraalkyllead product to be recovered may be necessary, and in the preferred embodiment wherein tetramethyllead and toluene mixtures are recovered, it is preferred that sufficient ethylene dichloride at a temperature of from about 20° F. to about 35° F. be used to contact the gaseous phase to cause the contacted inert gas vapors leaving the single tower to have a temperature of from about 30° F. to about 60° F.

In the embodiment for the recovery of tetramethyllead and toluene mixtures using two towers in series, it is preferred that sufficient chilled ethylene dichloride be fed to the two towers to cause the gaseous phase leaving the first tower to have a temperature of from about 45° F. to about 55° F. and the exiting vapors from the second tower to have a temperature of from about 30° F. to about 40° F. As is clear to those skilled in the art, suitable brine or other cooling medium in a sufficient quantity and at a sufficiently low temperature may be fed to the organic liquid cooling vessels to cool the organic liquid.

In a typical example of the operation of the process of this invention for the recovery of tetramethyllead and toluene from a nitrogen gas stream, a vapor feed composition having a concentration of 57 percent nitrogen, 40.2 percent tetramethyllead-toluene mixture and 2.8 percent water, all percentages by weight, and having a temperature of 100–110° F., was fed to a fume scrubber where it was scrubbed with a 4 percent by weight aqueous solution of sodium hydroxide. Scrubbed vapors continued to a first tower where they were contacted countercurrently with ethylene dichloride at a temperature of approximately 35° F. in a quantity sufficient to cause the gaseous phase leaving the first tower to have a temperature of approximately 50° F.

The contacted vapors from the overhead of the first tower were fed to the bottom of a second tower where they were contacted countercurrently with ethylene dichloride entering the tower at a temperature of approximately 32° F. Contacted vapors entered the second tower at a temperature of approximately 50° F. and exited at a temperature of approximately 35° F. Both towers were substantially identical and contained 2 inch steel pall rings in a depth in the tower sufficient to provide approximately three theoretical distillation plates in each tower and each tower was operated at substantially atmospheric pressure.

The concentration of the sodium hydroxide in the aqueous caustic solution was maintained at approximately 4 percent by weight by the addition of a 25 percent by weight aqueous sodium hydroxide solution as necessary and fresh ethylene dichloride was added to the sump of the second tower as necessary to compensate for the volume of ethylene dichloride-tetramethyllead-toluene mixture removed from the sump below the first tower.

Approximately 90 percent of the tetramethyllead-toluene mixture in the vapor feed stream was recovered in the first tower and a total of approximately 99 percent of the tetramethyllead-toluene mixture in the original vapor feed stream was recovered in the two tower system. Based upon total quantity of tetramethyllead produced from a reaction process not utilizing the process of this invention, sufficient tetramethyllead-toluene mixture was recovered using the process of this invention to increase the overall yield of the tetramethyllead produced approximately 4 to 5 percent. Similar recoveries are obtained when other tetraalkyllead products are treated in accordance with the process of this invention.

What is claimed is:

1. In a process for the production of tetraalkyllead product wherein tetraalkyllead containing inert gas is obtained, the improvement in the recovery of tetraalkyllead product comprising, in combination:
    (a) providing a first sump of organic scrubbing liquid,
    (b) cooling a portion of said organic scrubbing liquid from said first sump,
    (c) contacting said tetraalkyllead containing inert gas with the cooled portion of said organic scrubbing liquid to produce a first scrubbed gaseous phase and a first contacted organic liquid phase,
    (d) returning said first contacted organic liquid phase to said first sump, and
    (e) recovering a portion of said first sump as said tetraalkyllead product.

2. The process of claim 1 further characterized by said portion of said organic scrubbing liquid from said first sump being cooled sufficiently to cause said first scrubbed gaseous phase to have a temperature of from about 30° F. to about 60° F.

3. The process of claim 1 further characterized by the further treatment of said first scrubbed gaseous phase comprising, in combination:
    (a) providing a second sump of said organic scrubbing liquid,
    (b) cooling a portion of said organic scrubbing liquid from said second sump,
    (c) contacting said first scrubbed gaseous phase with the cooled portion of said organic scrubbing liquid from said second sump to produce a second scrubbed gaseous phase and second contacted organic liquid phase,
    (d) returning said second contacted organic liquid phase to said second sump,
    (e) providing overflow means from said second sump to said first sump to control the volume of liquid in said second sump, and
    (f) adding sufficient substantially pure said organic scrubbing liquid to said second sump to cause sufficient liquid to flow in said overflow means from said second sump to said first sump to maintain the volume of organic scrubbing liquid in said first sump substantially constant.

4. The process of claim 3 further characterized by said portion of said organic scrubbing liquid from said second sump being cooled sufficiently to cause said second scrubbed gaseous phase to have a temperature of from about 30° F. to about 60° F.

5. The process of claim 1 further characterized by adding sufficient substantially pure said organic scrubbing liquid to the said process to maintain the volume of said organic scrubbing liquid in said first sump substantially constant.

6. The process of claim 5 further characterized by the addition of sufficient substantially pure said organic scrubbing liquid being made to said portion of said organic scrubbing liquid to be cooled.

7. In an inert gas assisted process for transferring tetraalkyllead reaction mass from a reactor system to a steam distillation system for recovery of tetraalkyllead product wherein tetraalkyllead containing inert vent gas is obtained, the improvement in the recovery of tetraalkyllead product comprising, in combination:
    (a) scrubbing said tetraalkyllead containing inert vent gas with an aqueous caustic solution to produce a scrubbed gaseous phase and a liquid phase,
    (b) collecting said liquid phase in a first sump of organic scrubbing liquid to produce an aqueous liquid phase and a first organic liquid phase in said first sump,
    (c) cooling a portion of said first organic liquid phase from said first sump, (d) contacting said scrubbed gaseous phase with the cooled portion of said first organic liquid phase to produce a second scrubbed gaseous phase and a first contacted organic liquid phase, (e) returning said first contacted organic liquid phase to said first sump, and (f) recovering a portion of said first organic liquid phase from said first sump as said tetraalkyllead product.

8. The process of claim 7 further characterized by said tetraalkyllead product being tetramethyllead.

9. The process of claim 7 further characterized by said aqueous caustic solution being an aqueous solution of sodium hydroxide having a concentration of from about 1 to about 25 percent by weight of said aqueous solution.

10. The process of claim 7 further characterized by said inert gas being nitrogen.

11. The process or claim 7 further characterized by said organic scrubbing liquid being ethylene dichloride.

12. The process of claim 7 further characterized by said portion of said organic liquid phase being cooled sufficiently to cause said second scrubbed gaseous phase to have a temperature of from about 30° F. to about 60° F.

13. The process of claim 7 further characterized by said first sump being provided with overflow means to recover a portion of said aqueous liquid phase for recycle as said aqueous caustic solution.

14. The process of claim 7 further characterized by mixing a portion of said aqueous caustic solution with said tetraalkyllead containing inert vent gas prior to said scrubbing step.

15. The process of claim 7 further characterized by contacting said second scrubbed gaseous phase at least once with a portion of said aqueous caustic solution.

16. The process of claim 7 further characterized by adding sufficient substantially pure said organic scrubbing liquid to said process to maintain the volume of said organic scrubbing liquid in said first sump substantially constant.

17. The process of claim 16 further characterized by the addition of sufficient substantially pure said organic scrubbing liquid being made to said portion of said organic scrubbing liquid to be cooled.

18. The process of claim 7 further characterized by the further treatment of said second scrubbed gaseous phase comprising, in combination:

(a) providing a second sump of said organic scrubbing liquid, (b) cooling a portion of said organic liquid phase from said second sump, (c) contacting said second scrubbed gaseous phase with the cooled portion of said organic liquid phase from said second sump to produce a third scrubbed gaseous phase and a second contacted organic liquid phase, (d) returning said second contacted organic liquid phase to said second sump, (e) providing overflow means from said second sump to said first sump to control the volume of liquid in said second sump, and (f) adding sufficient substantially pure said organic scrubbing liquid to said second sump to cause sufficient said second contacted organic liquid phase to flow in said overflow means from said second sump to said first sump to maintain the volume of said first organic liquid phase in said first sump substantially constant.

19. The process of claim 18 further characterized by said portion of said organic liquid phase from said second sump being cooled sufficiently to cause said third scrubbed gaseous phase to have a temperature of from about 30° F. to about 60° F.

No references cited.

REUBEN FRIEDMAN, *Primary Examiner.*

C. N. HART, *Assistant Examiner.*